US009544131B2

(12) United States Patent
Karroumi et al.

(10) Patent No.: US 9,544,131 B2
(45) Date of Patent: Jan. 10, 2017

(54) EFFICIENT MODULAR ADDITION RESISTANT TO SIDE CHANNEL ATTACKS

(71) Applicant: THOMSON LICENSING, Issy de Moulineaux (FR)

(72) Inventors: Mohamed Karroumi, Rennes (FR); Benjamin Richard, Cesson-Sevigne (FR); Marc Joye, Fougeres (FR)

(73) Assignee: THOMSON LICENSING, Issy les Moulineaux (FR)

(*) Notice: Subject to any disclaimer, the term of this patent is extended or adjusted under 35 U.S.C. 154(b) by 0 days.

(21) Appl. No.: 14/568,556

(22) Filed: Dec. 12, 2014

(65) Prior Publication Data
US 2015/0172042 A1  Jun. 18, 2015

(30) Foreign Application Priority Data
Dec. 13, 2013 (EP) .................................... 13306721

(51) Int. Cl.
H04L 9/00 (2006.01)
G06F 7/72 (2006.01)
H04L 9/06 (2006.01)

(52) U.S. Cl.
CPC .............. H04L 9/003 (2013.01); G06F 7/72 (2013.01); G06F 7/727 (2013.01); H04L 9/0625 (2013.01);
(Continued)

(58) Field of Classification Search
CPC ............ H04L 9/002; H04L 9/003; H04L 9/06; H04L 9/0618; H04L 9/0625; H04L 2209/04; H04L 2209/046; G06F 7/72; G06F 7/727; G06F 7/764; G06F 2207/7233; G06F 2207/7238; G06F 2207/7247
See application file for complete search history.

(56) References Cited

U.S. PATENT DOCUMENTS

2001/0053220 A1* 12/2001 Kocher ................. G06F 21/556
380/29
2005/0259814 A1* 11/2005 Gebotys ................. H04L 9/003
380/28
(Continued)

FOREIGN PATENT DOCUMENTS
EP          2634953         9/2013

OTHER PUBLICATIONS

Anonymous: Bitwise operations in C—Wikipedia, the free encyclopedia, Dec. 11, 2013, Retrieved from the Internet:URL:http://en.wikipedia.org[retrieved on May 27, 2014].
(Continued)

Primary Examiner — Eric W Shepperd

(57) ABSTRACT

A cryptographic device performs modular addition between a first integer value x and a second integer value y in a processor by: obtaining a first masked input $\hat{x}$, a second masked input $\hat{y}$, a first mask $r_x$ and a second mask $r_y$, the first masked input $\hat{x}$ resulting from the first integer value x masked by the first mask $r_x$ and the second masked input $\hat{y}$ resulting from the second integer value y masked by the second mask $r_y$; computing a first iteration masked carry value $\hat{c}_1$, using the first masked input $\hat{x}$, the second masked input $\hat{y}$, the first mask $r_x$, the second mask $r_y$ and a carry mask value $\lambda$; recursively updating the masked carry value $\hat{c}_i$ to obtain a final masked carry value $\hat{c}_{k-1}$, wherein the masked carry value is updated using the first masked input $\hat{x}$, the second masked input $\hat{y}$, the first mask $r_x$, the second mask $r_y$, and the carry mask value $\lambda$; combining the first masked input $\hat{x}$ and the second masked input $\hat{y}$ and the final masked value $\hat{c}_{k-1}$ to obtain an intermediate value; combining the intermediate value with the carry mask value to obtain a masked result; and outputting the masked result and a combination
(Continued)

of the first mask $r_x$ and the second mask $r_y$. It is preferred that the combinations use XOR.

11 Claims, 2 Drawing Sheets

(52) U.S. Cl.
CPC ... *G06F 2207/7238* (2013.01); *H04L 2209/12* (2013.01)

(56) References Cited

U.S. PATENT DOCUMENTS

| | | | |
|---|---|---|---|
| 2005/0271202 A1* | 12/2005 | Shu | G06F 9/3001 380/29 |
| 2007/0116270 A1* | 5/2007 | Fischer | G06F 7/722 380/30 |
| 2008/0301458 A1* | 12/2008 | Ebeid | G06F 7/725 713/180 |
| 2009/0010424 A1* | 1/2009 | Qi | G06F 7/723 380/28 |
| 2009/0086961 A1* | 4/2009 | Sauzet | G06F 7/728 380/28 |
| 2009/0092245 A1* | 4/2009 | Fumaroli | G06F 7/723 380/28 |
| 2009/0116644 A1* | 5/2009 | Klimov | G06F 21/556 380/252 |
| 2011/0013767 A1* | 1/2011 | Kim | H04L 9/003 380/28 |
| 2013/0028412 A1* | 1/2013 | Coron | H04L 9/003 380/28 |
| 2014/0143883 A1* | 5/2014 | Shen-Orr | G06F 21/558 726/26 |
| 2014/0281573 A1* | 9/2014 | Jaffe | G06F 21/72 713/189 |
| 2015/0244524 A1* | 8/2015 | Pulkus | H04L 9/003 380/28 |

OTHER PUBLICATIONS

Trichina: "Combinational Logic Design for AES SubByte Transformation on Masked Data", International Association for Cryptologic Research, vol. 28831112:135428, Nov. 12, 2003, pp. 1-13.
Schulte-Geers: "On CCZ-equivalence of addition mod 2", Designs, Codes and Cryptography, Kluwer Academic Publishers, BO, vol. 66, No. 1-3, May 25, 2012, pp. 111-127.
Goubin L et al: "A Sound Method for Switching Between Boolean and Arithmetic Masking", Cryptographic Hardware and Embedded Systems. 3rd International Workshop, CHES 2001, May 14-16, 2001, pp. 3-15.
Bettale: "Secure Multiple SBoxes Implementation with Arithmetically Masked Input"; Oberthur Technologies—71-73 rue des Hautes Pâtures—92726 Nanterre Cedex—France; pp. 1-15.
B. Debraize—"Efficient and Provably Secure Methods for Switching from Arithmetic to Boolean Masking"—Gemalto—Security to be free; pp. 1-28.
Kocher et al: "Differential power analysis"; Advances in Cryptology—CRYPTO'99 vol. 1666 of Lecture Notes in Computer Science, pp. 388-397, 1999.
Baek et al: "Differential Power Attack and Masking Method"; Trends in Mathematics—Information Center for Mathematical Sciences—vol. 8, No. 1, Jun. 2005, pp. 1-15.
Search Report Dated May 28, 2014.
Akkar et al., "A Generic Protection against High-Order Differential Power Analysis", 10th International Conference Workshop on Fast Software Encryption (FSE 2003), Lund, Sweden, Feb. 24, 2003, pp. 192-205.
Akkar et al., "An Implementation of DES and AES, Secure against Some Attacks", Third International Workshop on Cryptographic Hardware and Embedded Systems, Paris, France, May 14, 2001, pp. 309-318.
Brier et al., "Correlation Power Analysis with a Leakage Model", Sixth International Workshop on Cryptographic Hardware and Embedded Systems, Cambridge, Massachusetts, USA, Aug. 11, 2004, pp. 16-29.
Chari et al., "Towards Sound Approaches to Counteract Power-Analysis Attacks", 19th Annual International Cryptology Conference, Santa Barbara, California, USA, Aug. 15, 1999, pp. 398-412.
Coron et al., "A New Algorithm for Switching from Arithmetic to Boolean Masking", 5th International Workshop on Cryptographic Hardware and Embedded Systems, Cologne, Germany, Sep. 8, 2003, pp. 89-97.
Coron et al., "On Boolean and Arithmetic Masking against Differential Power Analysis", Second International Workshop on Cryptographic Hardware and Embedded Systems, Worchester, Massachusetts, USA, Aug. 17, 2000, pp. 231-237.
Daemen et al., "Bitslice Ciphers and Power Analysis Attacks", 8th International Workshop on Fast Software Encryption, Yokohama, Japan, Apr. 2, 2001, pp. 134-149.
Anonymous, "Secure Hash Standard", Computer Security Standard, Cryptography, National Institute of Standards and Technology, Federal Information Processing Standards Publication 180-2,1 Aug. 2001, pp. 1-76.
Golic, "Techniques for Random Masking in Hardware", IEEE Transactions on Circuits and Systems, vol. 54, No. 2, Feb. 2007, pp. 291-300.
Goubin et al., "DES and Differential Power Analysis (The "Duplication" Method)", First International Workshop on Cryptographic Hardware and Embedded Systems, Worchester, Massachusetts, USA, Aug. 12, 1999, pp 158-172.
Massey, "Safer K-64: A Byte-Oriented Block-Ciphering Algorithm", Fast Software Encryption, Cambridge Security Workshop, Cambridge, England, United Kingdon, Dec. 9, 1993, pp. 1-17.
McEvoy et al., "Differential Power Analysis of HMAC based on SHA-2, and Countermeasures", 8th International Workshop on Information Security Applications, Jeju Island, Korea, Aug. 27, 2007, pp. 317-332.
Messerges, "Securing the AES Finalists Against Power Analysis Attacks", 7th International Workshop on Fast Software Encryption, New York, New York, USA, Apr. 10, 2000, pp. 150-164.
Neiβe et al., "Switching Blindings with a View Towards Idea", Sixth International Workshop on Cryptographic Hardware and Embedded Systems, Cambridge, Massachusetts, USA, Aug. 11, 2004, pp. 230-239.
Ors et al., "Power-Analysis Attack on an ASIC AES implementation", International Conference on Information Technology: Coding and Computing, vol. 2, Apr. 5, 2004, pp. 546-552.
Standaert et al., "Power Analysis Attacks against FPGA Implementations of the DES", 14th International Conference on Field Programmable Logic and Application, Leuven, Belgium, Aug. 30, 2004, pp. 84-94.
Ferguson et al., "The Skein Hash Function Family", Submission to National Institute for Standards and Technology, SHA-3 Competition, Version 1.3, Oct. 1, 2010, pp. 1-100.
Naccache et al., "Can D.S.A. be Improved?—Complexity Trade-Offs with the Digital Signature Standard"—Workshop on the Theory and Application of Cryptographic Techniques, Perugia, Italy, May 9, 1994, pp. 77-85.

\* cited by examiner

//www.w3.org/1998/Math/MathML
EFFICIENT MODULAR ADDITION RESISTANT TO SIDE CHANNEL ATTACKS This application claims the benefit, under 35 U.S.C. §119 of European Patent Application No. 13306721.5, filed Dec. 13, 2013.

TECHNICAL FIELD

The present principles relate generally to cryptography and in particular to a modular addition algorithm secure against Differential Power Analysis (DPA) attacks.

BACKGROUND

This section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Modular addition is used in many cryptographic implementations. A well-known constant-time addition algorithm is the following, where $\oplus$ is a bitwise XOR operation and $\wedge$ a bitwise AND operation.

---

Algorithm 1 Adder algorithm (constant-time)

Input: two k-bit operands (x, y)
Output: A = x + y mod $2^k$
/* Initialization */
1: A ← x $\oplus$ y
2: B ← x $\wedge$ y
3: C ← 0
/* Main loop */
4: for i = 1 to k − 1 do
5:    C ← C $\wedge$ A
6:    C ← C $\oplus$ B
7:    C ← 2C
8: end for
/* Aggregation */
9: A ← A $\oplus$ C
10: return A

---

With this algorithm, the carry $c_i$ computed in step i using the register C is recursively defined as $$c_i = \begin{cases} 0, & \text{for } i = 0 \\ 2[c_{i-1} \wedge (x \oplus y) \oplus (x \wedge y)], & \text{for } 1 \leq i \leq k-1 \end{cases}$$

Once the last carry $c_{k-1}$ has been computed, the addition result is obtained as $$x+y = x \oplus y \oplus c_{k-1}.$$

It will be appreciated that Algorithm 1 in some cases can be attacked using Differential Power Analysis (DPA) and related attacks introduced by Kocher et al. [see Paul Kocher, Joshua Jaffe, and Benjamin Jun. Differential power analysis. In M. Wiener, editor, *Advances in Cryptology—CRYPTO '99*, volume 1666 of *Lecture Notes in Computer Science*, pages 388-397. Springer-Verlag, 1999.]. Such attacks exploit side-channel leakage to uncover secret information. During the execution of a cryptographic algorithm, the secret key or some related information may be revealed by monitoring the power consumption of the electronic device executing the cryptographic algorithm. DPA-type attacks potentially apply to all cryptosystems, including popular block-ciphers like DES or AES.

The commonly suggested way to thwart DPA-type attacks for implementations of block-ciphers is random masking. The idea is to blind sensitive data with a random mask at the beginning of the algorithm. The algorithm is then executed as usual. Of course, at some step within a round the value of the mask (or a value derived thereof) must be known in order to correct the corresponding output value.

For cryptographic algorithms involving different types of operations, two masking techniques usually have to be used: a Boolean masking (generally by applying an XOR) and an arithmetic masking (by applying an +). Furthermore, it is useful to have efficient and secure methods for switching from Boolean masking to arithmetic masking, and conversely.

Two secure algorithms were proposed by Goubin [see Louis Goubin. A sound method for switching between Boolean and arithmetic masking. In ç. K. Koç, D. Naccache, and C. Paar, editors, *Cryptographic Hardware and Embedded Systems*—CHES 2001, volume 2162 of *Lecture Notes in Computer Science*, pages 3-15. Springer-Verlag, 2001.]. Each algorithm works in one direction: the first converts from Boolean to arithmetic and the second from arithmetic to Boolean. The secure Arithmetic-to-Boolean conversion is however less efficient than the secure Boolean-to-Arithmetic conversion. The cost of the latter depends on the length of the masked operands that is 5·k+5 operations, where k is the length of the operands. Thus, typically 5·32+5=165 operations are required for 32-bit inputs.

Generally expressed, the masking problem for modular addition, can be stated as how to securely compute the addition of k-bit operands x and y from Boolean masked inputs $(\hat{x}, \hat{y})$ while the k-bit result is still Boolean masked. A modular addition is a carried out with classical switching methods in three steps:

1. Convert first the Boolean masked inputs $\hat{x} = x \oplus r_x$ and $\hat{y} = y \oplus r_y$ to arithmetic masked inputs $A_x = x - r_x$ and $A_y = y - r_y$ using Boolean-to-Arithmetic conversion algorithm. This operation is efficient and takes 7 elementary operations (see Goubin's paper) for each conversion.
2. Perform two separate additions, one with the masked data and the other with the masks $(A_x + A_y = x - r_x + y - r_y, r_x + r_y)$. This costs 2 operations; and
3. Convert the addition result of masked data back to a Boolean masked output $\hat{z} = (x+y) \oplus (r_x + r_y)$ using an Arithmetic-to-Boolean conversion algorithm.

The overall computation cost for one secure addition is then 5 k+5+2·7+2=5 k+21 operations using Goubin's conversion methods. A typical cost for one secure addition is thus 5·32+21=181 operations for 32-bit inputs.

To make Algorithm 1 masked, it must be ensured that the computations do not leak information about x, y or the carry $c_i$. It is easily seen that the carry $c_i$ is a function of x and y. Thus, if the carry is not masked, it would leak information about x and y and this information could be used by an attacker to launch a side-channel attack (such as DPA). In his Arithmetic-to-Boolean conversion algorithm, Goubin proposed to blind the carry value using a random $\lambda$ as $\hat{c}_{i-1} = c_{i-1} \oplus 2\lambda$. This idea can be applied to Algorithm 1, which gives the following constant-time algorithm.

Algorithm 2 Adder algorithm (with blinded carry)

Input: $(x, y) \in \mathbb{Z}_{2^k} \times \mathbb{Z}_{2^k}$
Output: $x + y \pmod{2^k}$
/* Initialization */
1: $A \leftarrow x \oplus y$
2: $B \leftarrow x \wedge y$
3: $C \leftarrow \lambda$
/* $\Omega = \lambda \oplus (x \wedge y) \oplus 2\lambda \wedge (x \oplus y)$ */
4: $B \leftarrow B \oplus C$
5: $C \leftarrow 2C$
6: $\Omega \leftarrow C \wedge A$
7: $\Omega \leftarrow \Omega \oplus B$
/* Main loop */
8: for $i = 1$ to $k - 1$ do
9: $\quad B \leftarrow B \wedge A$
10: $\quad B \leftarrow B \oplus \Omega$
11: $\quad B \leftarrow 2B$
12: end for
/* Aggregation */
13: $A \leftarrow A \oplus B$
14: $A \leftarrow A \oplus C$
15: return $A$ From an efficiency perspective, it is interesting to re-use the same mask $2\lambda$ for all the successive carries. In Algorithm 2, a mask correction value $\Omega$ should thus be computed for each round as $\Omega = [2\lambda \wedge (x \oplus y) \oplus (x \wedge y)] \oplus \lambda$. As $2\lambda$ is re-used for every iteration, the correction term $\Omega$ is the same for each iteration. This term can thus be computed once and then passed along to all iterations of the masked carry-chain calculation. The skilled person will appreciate that it is preferred to use a new random mask for each new addition to ensure the uniform distribution of masks remains between two algorithm executions.

The masked version of the carry equation is as follows:

$$\hat{c}_i = \begin{cases} 2\lambda, & \text{for } i = 0 \\ 2[\hat{c}_{i-1} \wedge (x \oplus y) \oplus \Omega], & \text{for } 1 \leq i \leq k - 1 \end{cases}$$

At the end, $\hat{c}_{k-1} = c_{k-1} \oplus 2\lambda$. Therefore, $x+y$ can be obtained using two additional XOR operations in the Aggregation phase by calculating $$x+y = x \oplus y \oplus \hat{c}_{k-1} \oplus 2\lambda$$

In previous algorithm only the carry is masked. It will be appreciated that it is desired to make such an addition more efficient and work with blinded inputs x and y. In other words to have a solution that is secure and uses less operations for the addition. The present principles provide such a solution.

SUMMARY

In a first aspect, the principles are directed to a method of performing modular addition between a first integer value x and a second integer value y. A hardware processor obtains a first masked input $\hat{x}$, a second masked input $\hat{y}$, a first mask $r_x$ and a second mask $r_y$, the first masked input $\hat{x}$ resulting from the first integer value x masked by the first mask $r_x$ and the second masked input $\hat{y}$ resulting from the second integer value y masked by the second mask $r_y$; computes a first iteration carry value $c_1$, using the first masked input $\hat{x}$, the second masked input $\hat{y}$, the first mask $r_x$, the second mask $r_y$; recursively updates intermediate carry values $c_i$ to obtain a final carry value $c_{k-1}$, wherein an intermediate carry value is updated using the first masked input $\hat{x}$, the second masked input $\hat{y}$, the first mask $r_x$ and the second mask $r_y$; combines the first masked input $\hat{x}$ and the second masked input $\hat{y}$ and the final carry value $c_{k-1}$ to obtain a masked result; and outputs the masked result.

In an embodiment, the first iteration carry value, the intermediate carry values and the final carry value are masked, the first iteration carry value $c_1$ is computed using also a carry mask value $\lambda$, and the intermediate carry values $c_i$ are updated using also the carry mask value $\lambda$; and the masked result is obtained by combining the first masked input $\hat{x}$ and the second masked input $\hat{y}$ and the final masked carry value to obtain an intermediate value and combining the intermediate value with the carry mask value to obtain a masked result. It is advantageous that the intermediate value and the masked result are obtained using XOR between the combined values. It is alternatively advantageous that the method further comprises outputting a combination of the first mask $r_x$ and the second mask $r_y$; it is then preferred that the combination of the first mask $r_x$ and the second mask $r_y$ is obtained using XOR.

In a further embodiment, the modular addition is used to subtract the second integer value y from the first integer value x, the method further comprising: between the obtaining and the computing, setting the first masked input $\hat{x}$ to the bitwise complementation of the first masked input $\hat{x}$; and between the combining and the outputting, setting the masked result to the bitwise complementation of the masked result.

In a second aspect, the principles are directed to a method of performing modular addition between n integer values $x_1 \ldots x_n$, wherein $n \geq 3$, the method comprising, in a hardware processor: obtaining n masked inputs $\hat{x}_1 \ldots \hat{x}_n$ and n masks $r_1 \ldots r_n$, wherein each masked input $\hat{x}_i$ results from a combination between an integer value $x_i$ and a corresponding mask $r_i$; generating a first intermediate couple of a masked value and a mask $(A_1, R_{A1})$ using masked inputs $\hat{x}_1$, $\hat{x}_2$, $\hat{x}_3$ and the corresponding masks $r_1$, $r_2$, $r_3$; generating a second intermediate couple of masked value and a mask $(B_1, R_{B1})$ using masked inputs $\hat{x}_1$, $\hat{x}_2$, $\hat{x}_3$ and the corresponding masks $r_1$, $r_2$, $r_3$; if $n > 3$, performing $n-3$ iterations, where k is a present iteration, of: computing a k-th first intermediate couple of a masked value and a mask $(A_k, R_{Ak})$, using the first intermediate couple of a masked value and a $(A_{k-1}, R_{Ak-1})$ the second intermediate couple of a masked value and a mask $(B_{k-1}, R_{Bk-1})$, and a masked input and a mask $(\hat{x}_{k+3}, r_{k+3})$; and computing a k-th first intermediate couple of a masked value and a mask $(B_k, R_{Bk})$, using the first intermediate couple of a masked value and a mask $(A_{k-1}, R_{Ak-1})$ the second intermediate couple of a masked value and a mask $(B_{k-1}, R_{Bk-1})$, and a couple of input $(\hat{x}_{k+3}, r_{k+3})$; and performing a modular addition between the first intermediate couple value $(A_k, R_{Ak})$, and the second intermediate couple values $(B_k, R_{Bk})$, to obtain a masked result; and outputting the masked result.

In an embodiment, the intermediate masked values $A_1, \ldots, A_k$ are a combination of masked inputs $\hat{x}_1 \ldots \hat{x}_n$ and the combinations are obtained using a XOR between the input values, and where the masks $R_{A1}, \ldots, R_{Ak}$ are random or a combination of masks $r_1 \ldots r_n$, and where the combinations are obtained using XOR between the mask values; and the intermediate masked values $B_1, \ldots, B_k$ are combinations of masked inputs $\hat{x}_1 \ldots \hat{x}_n$ and the combinations are obtained using a XOR and an AND between the input values and where the masks $R_{B1}, \ldots, R_{Bk}$ are random or combinations of masks $r_1 \ldots r_n$, and the combinations are obtained using a XOR between the mask values.

In a third aspect, the principles are directed to a device for performing modular addition between a first integer value x and a second integer value y, the device comprising a hardware processor configured to: obtain a first masked input $\hat{x}$, a second masked input $\hat{y}$, a first mask $r_x$ and a second mask $r_y$, the first masked input $\hat{x}$ resulting from the first integer value x masked by the first mask $r_x$ and the second masked input $\hat{y}$ resulting from the second integer value y masked by the second mask $r_y$; compute a first iteration carry value $c_1$ using the first masked input $\hat{x}$, the second masked input $\hat{y}$, the first mask $r_x$, the second mask $r_y$; recursively update intermediate carry values $c_i$ to obtain a final carry value $c_{k-1}$, wherein an intermediate carry value is updated using the first masked input $\hat{x}$, the second masked input $\hat{y}$, the first mask $r_x$ and the second mask $r_y$; combine the first masked input $\hat{x}$ and the second masked input $\hat{y}$ and the final carry value $c_{k-1}$ to obtain a masked result; and output the masked result.

In an embodiment, the first iteration carry value, the intermediate carry values and the final carry value are masked and the hardware processor is configured to: compute the first iteration carry value $c_1$ using also a carry mask value $\lambda$; and update the intermediate carry values $c_i$ using also the carry mask value $\lambda$; and the hardware processor is configured to combine the first masked input $\hat{x}$ and the second masked input $\hat{y}$ and the final masked carry value to obtain an intermediate value, and to combine the intermediate value with the carry mask value to obtain the masked result. It is advantageous that the intermediate value and the hardware processor is configured to use XOR between the combined values to obtain the masked result. It is alternatively advantageous that the hardware processor is further configured to output a combination of the first mask $r_x$ and the second mask $r_y$.

In a further embodiment, the hardware processor is configured to use the modular addition to subtract the second integer value y from the first integer value x, and the hardware processor is further configured to: set the first masked input $\hat{x}$ to the bitwise complementation of the first masked input $\hat{x}$; and set the masked result to the bitwise complementation of the masked result.

In a fourth second aspect, the principles are directed to a device for performing modular addition between n integer values $x_1 \ldots x_n$, wherein n≥3, the device comprising a hardware processor configured to: obtain n masked inputs $\hat{x}_1 \ldots \hat{x}_n$ and n masks $r_1 \ldots r_n$, wherein each masked input $\hat{x}_i$ results from a combination between an integer value $x_i$ and a corresponding mask $r_i$; generate a first intermediate couple of masked and mask values $(A_1, R_{A1})$ using masked inputs $\hat{x}_1, \hat{x}_2, \hat{x}_3$ and the corresponding masks $r_1, r_2, r_3$; generate a second intermediate couple of masked and mask values $(B_1, R_{B1})$ using masked inputs $\hat{x}_1, \hat{x}_2, \hat{x}_3$ and the corresponding masks $r_1, r_2, r_3$; if n>3, perform n−3 iterations, where k is a present iteration, of: computing a k-th first intermediate couple of masked and mask values $(A_k, R_{Ak})$, using the first intermediate couple of masked and mask values $(A_{k-1}, R_{Ak-1})$ the second intermediate couple of masked and mask values $(B_{k-1}, R_{Bk-1})$, and a couple of input $(\hat{x}_{k+3}, r_{k+3})$; and computing a k-th first intermediate couple of masked and mask values $(B_k, R_{Bk})$, using the first intermediate couple of masked and mask values $(A_{k-1}, R_{Ak-1})$ the second intermediate couple of masked and mask values $(B_{k-1}, R_{Bk-1})$, and a couple of input $(\hat{x}_{k+3}, r_{k+3})$; and perform a modular addition between the first intermediate couple value $(A_k, R_{Ak})$, and the second intermediate couple values $(B_k, R_{Bk})$ to obtain a masked result; and output the masked result.

It is advantageous that the intermediate masked values $A_1, \ldots, A_k$ are a combination of masked inputs $\hat{x}_1 \ldots \hat{x}_n$ and the combinations are obtained using a XOR between the input values, and where mask values $R_{A1}, \ldots, R_{Ak}$ are random or a combination of masks $r_1 \ldots r_n$, and where the combinations are obtained using XOR between the mask values; and the intermediate masked value $B_1, \ldots, B_k$ are combinations of masked inputs $\hat{x}_1 \ldots \hat{x}_n$ and the combinations are obtained using a XOR and an AND between the input values and where the mask values $R_{B1}, \ldots, R_{Bk}$ are random or combinations of masks $r_1 \ldots r_n$, and the combinations are obtained using a XOR between the mask values.

BRIEF DESCRIPTION OF DRAWINGS

Preferred features of the present principles will now be described, by way of non-limiting example, with reference to the accompanying drawings, in which.

DESCRIPTION OF EMBODIMENTS

Figure 1:
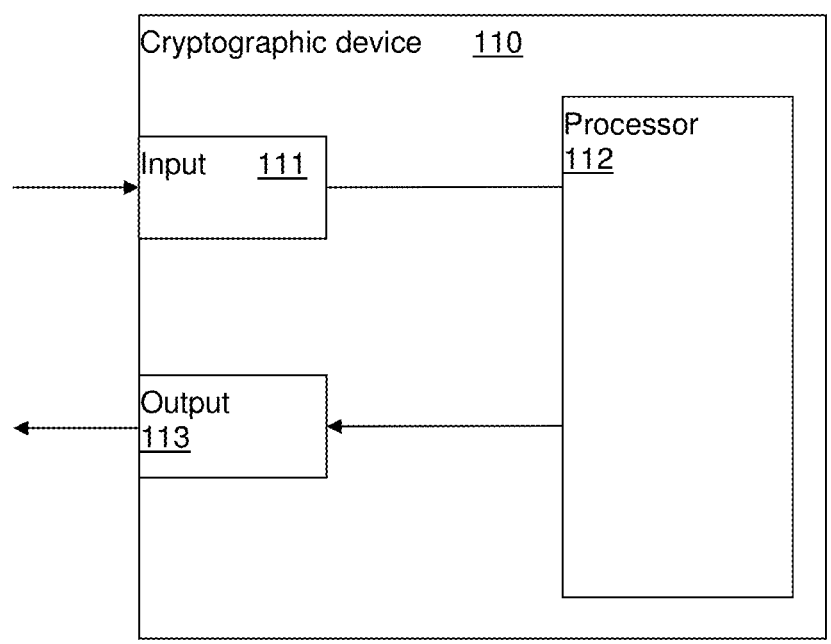
FIG. 1 illustrates a cryptographic device according to a preferred embodiment of the present principles.

A main idea of the present principles is to compute addition from Boolean masked inputs by implementing a secure version of the modular addition, that is an implementation where the input values of x and y and the successive values of the carry $c_i$ are kept always masked and where the algorithm outputs a Boolean masked result. This approach is effective if an addition modulo $2^k$ occurs in combination with a Boolean operation (e.g. a XOR or any operation that is compatible with Boolean masking like logical Shifts and Rotations).

In the algorithm of the present principles, it is ensured that the computations do not leak information about x and y, nor about the successive carries $c_i$.

Goubin's idea is followed and the carry with $2\lambda$ is masked, but a change is introduced. Indeed, it is remarked that both the first round carry $c_1$ and $\Omega$ can be computed from the same value $\Omega_0 = (x \wedge y) \oplus \lambda$. It is then proposed to reorder the operations for computing $\Omega$. The reordering allows saving a few operations in the secure version of the algorithm.

Given that $\hat{c}_0 = 2\lambda$ and the definition of $\Omega$, the masked version of the carry equation simplifies to:

$$\hat{c}_i = \begin{cases} 2\Omega_0, & \text{for } i = 0 \\ 2[\hat{c}_{i-1} \wedge (x \oplus y) \oplus \Omega], & \text{for } 2 \leq i \leq k-1 \end{cases}$$

where $\Omega = [2\lambda \wedge (x \oplus y)] \oplus \Omega_0$ is pre-computed once and is the same for round i=1 and for all rounds i∈{2, ..., k−1}. This means that the first loop iteration is saved and three operations (one AND, one XOR and one Shift) are traded against one Shift operation. The main loop for the blinded carry addition algorithm then becomes:

```
/* First round iteration (i = 1) */
B ← 2Ω
/* Main loop */
for i = 2 to k−1 do
    B ← B ∧ A
    B ← B ⊕ Ω
    B ← 2B
end for
```

It now remains to compute securely $\hat{c}_i$ from blinded inputs $\hat{x}=x\oplus r_x$ and $\hat{y}=y\oplus r_y$. From a security view-point, at each step of the loop the computation of $\hat{c}_i$ depends on the computation of $\Lambda_i\oplus\Omega$, where $\Lambda_i=\hat{c}_{i-1}\wedge(x\oplus y)$. The computation of $\Lambda_i$ and $\Omega$ can be carried out separately and in a secure way. Regarding $\Omega=2\lambda\wedge(x\oplus y)\oplus\Omega_0$, the first part of $\Omega$, i.e. $2\lambda\wedge(x\oplus y)$ can be securely implemented as $$A=x\oplus y, A=A\wedge 2\lambda,$$

and $$R=r_x\oplus r_y, R=R\wedge 2\lambda.$$

It will be appreciated that A and R cannot be XOR-ed together as this would unmask the operands. For the second part of $\Omega$, i.e. $\Omega_0=(x\wedge y)\oplus\lambda$, the calculation relies on a method proposed by Elena Trichina [see Combinational Logic Design for AES Subbyte Transformation on Masked Data. *IACR Cryptology ePrint Archive*, 2003:236, 2003]. Given the distributive property of the bitwise AND over the XOR, a masked version of the bitwise AND operation can be divided in four AND operations calculated pair-wise between masked data and masks (operations are done with masked data and masks independent from each other):

$$\lambda\oplus x\wedge y=\lambda\oplus r_x\wedge r_y\oplus \hat{y}\wedge r_x\oplus \hat{x}\wedge \hat{y}\oplus \hat{x}\wedge r_y$$

If evaluated left-to-right, the expression does not leak any information about the operands. Interestingly, the result of the expression is randomized with $\lambda$ and thus is uniformly distributed. This result can be subsequently XOR-ed with values A and R without unmasking the operands. In the present principles, $\Omega$ can then be calculated from the inputs $\hat{x}$, $\hat{y}$, $r_x$, $r_y$ and $\lambda$ as follows:
1. Compute $\Omega_0=\lambda\oplus x\wedge y$ using the equation hereinbefore.
2. Compute $\Omega=\Omega_0\oplus A$.
3. Compute $\Omega=\Omega\oplus R$.

Regarding $\Lambda=_i=c_{i-1}\wedge(x\oplus y)$ and given the Boolean masking form $\hat{x}=x\oplus r_x$, $\hat{y}=y\oplus r_y$, its masked version can be computed as
1. Compute $\hat{\Lambda}_i=\hat{c}_{i-1}\wedge(\hat{x}\oplus\hat{y})$.
2. Compute $r_{\Lambda_i}=\hat{c}_{i-1}\wedge(r_x\oplus r_y)$.

Similarly to A and R, the values $\hat{\Lambda}_i$ and $r_{\Lambda_i}$ cannot be XOR-ed together as this would unmask the operands. Hence, $\Omega$ is randomized with $\lambda$, and can then be used to securely compute $\hat{c}_i$ as $\hat{c}_i=\hat{\Lambda}_i\oplus\Omega\oplus r_{\Lambda_i}$. The secure addition algorithm is illustrated in Algorithm 3:

Algorithm 3 Secure addition

Input: $(\hat{x}, \hat{y}, r_x, r_y)$ where $\hat{x}=x\oplus r_x$ and $\hat{y}=y\oplus r_y$
Output: (A, R) where $A=(x+y)\oplus r_x\oplus r_y$ and $R=r_x\oplus r_y$
/* Initialization */
1: $C \leftarrow \lambda$ (random that can be pre-generated)
/* Compute $\Omega_0 = \lambda \oplus x\wedge y$ */
2: $T \leftarrow r_x \wedge r_y$
3: $\Omega \leftarrow T \oplus C$
4: $T \leftarrow \hat{y}\wedge r_x$
5: $\Omega \leftarrow \Omega \oplus T$
6: $T \leftarrow \hat{x}\wedge\hat{y}$
7: $\Omega \leftarrow \Omega \oplus T$
8: $T \leftarrow \hat{x}\wedge r_y$
9: $\Omega \leftarrow \Omega \oplus T$
/* Compute $\Omega = \Omega_0 \oplus 2\lambda\wedge(x\oplus y)$ */
10: $A \leftarrow \hat{x} \oplus \hat{y}$
11: $R \leftarrow r_x \oplus r_y$
12: $C \leftarrow 2C$
13: $T \leftarrow C \wedge A$
14: $\Omega \leftarrow \Omega \oplus T$
15: $T \leftarrow C \wedge R$ Algorithm 3 Secure addition 16: $\Omega \leftarrow \Omega \oplus T$
/* First round (i = 1) */
17: $D \leftarrow 2\Omega$
/* Main loop */
18: for i = 2 to k − 1 do
19: $\quad T \leftarrow D \wedge R$
20: $\quad D \leftarrow D \wedge A$
21: $\quad D \leftarrow D \oplus \Omega$
22: $\quad D \leftarrow D \oplus T$
23: $\quad D \leftarrow 2D$
24: end for
/* XOR with the final carry */
25: $A \leftarrow A \oplus D$
/* Remove the carry mask $2\lambda$ */
26: $A \leftarrow A \oplus C$
27: return (A, R)

From a performance point of view, $\Omega$ is pre-computed when the main loop starts as well as $A=\hat{x}\oplus\hat{y}$ and $R=r_x\oplus r_y$. This pre-computation enables the update of $\hat{c}_i$ inside the main loop using only two additional operations when compared to Algorithm 2 (one AND and one XOR). Algorithm 3 uses 4 additional temporary variables (C, D, T and $\Omega$), generates one random and takes 5 k+8 operations: 2 k+6 XORs, 2 k+2 ANDS and k logical shifts.

Variant Embodiment

It will be appreciated that it can happen that one of the two operands is masked while the other is not (i.e. adding a variable 2 and a constant K). This can for example be useful with cryptographic algorithms that perform addition and subtraction with pre-defined constants. In a prior art solution, the Boolean masked input $\hat{x}=x\oplus r_x$ is first converted to arithmetic masked value $A_x=x-r_x$ using 7 operations. Then the addition with the constant is performed ($A_x+K=x-r_x+K$, $r_x$)—with an unchanged mask—and the addition result is finally converted back to a Boolean masked output $\hat{y}=(x+K)\oplus r_x$ using an Arithmetic-to-Boolean conversion algorithm. This costs 5 k+5+7+1=5 k+13 operations using Goubin's conversion methods.

The following Algorithm 4 provides a faster algorithm. The main difference to Algorithm 3 is in the initialization step where some operations can be saved as only one operand is masked.

Algorithm 4 Secure addition with one masked operand

Input: $(\hat{x}, K, r_x)$ where $\hat{x}=x\oplus r_x$
Output: $A = (x + K) \oplus r_x \mod 2^k$
/* Initialization */
1: $C \leftarrow \lambda$ (random that can be pre-generated)
/* Compute $\Omega = \lambda \oplus K\wedge r_x \oplus \hat{x}\wedge K$ */
2: $\Omega \leftarrow K\wedge r_x$
3: $\Omega \leftarrow \Omega \oplus C$
4: $T \leftarrow \hat{x}\wedge K$
5: $\Omega \leftarrow \Omega \oplus T$
/* Compute $\Omega = \Omega \oplus 2\lambda\wedge(\hat{x}\oplus K) \oplus 2\lambda\wedge r_x$ */
6: $A \leftarrow \hat{x} \oplus K$
7: $C \leftarrow 2C$
8: $T \leftarrow C \wedge A$
9: $\Omega \leftarrow \Omega \oplus T$
10: $T \leftarrow C \wedge r_x$
11: $\Omega \leftarrow \Omega \oplus T$
/* First round (i = 1)*/
12: $D \leftarrow 2\Omega$
/* Main loop */

| Algorithm 4 Secure addition with one masked operand |
| --- |
| 13: for i = 2 to k − 1 do |
| 14:     T ← D ∧ $r_x$ |
| 15:     D ← D ∧ A |
| 16:     D ← D ⊕ Ω |
| 17:     D ← D ⊕ T |
| 18:     D ← 2D |
| 19: end for |
| /* XOR with the final carry */ |
| 20: A ← A ⊕ D |
| /* Remove the carry mask 2λ */ |
| 21: A ← A ⊕ C |
| 22: return A |

The main loop and the aggregation step of the algorithm remain essentially unchanged. Compared to the initialization of Algorithm 3, it will be appreciated that 5 elementary operations are saved (two ANDS and three XORs), which reduces the algorithm cost to 5 k+3 operations.

The algorithms described so far add at most two operands, but certain cryptographic algorithms require the addition of more operands. The straightforward way of adding m integers is to add the first two, then to add the resulting sum to the next integer, and so on. This would require a total of m−1 additions. As the secure addition algorithm of the present principles costs 5 k+8 operations, an addition with m blinded operands would have a huge cost; i.e. (m−1)×(5 k+8) operations, rendering it unusable in practice.

The following algorithm provides a much more efficient approach that follows the so-called "carry-save addition" technique. Loosely speaking, it consists in keeping track of the carry in a separate variable. For example, for adding three k-bit integers x, y, z∈$\mathbb{Z}_{2^k}$:

$$x+y+z=(x\oplus y\oplus z)+2(z\wedge(x\oplus y)\oplus(x\wedge y))(\bmod\ 2^k).$$

It will be appreciated that the addition of three integers boils down to adding two integers A and B, where $$A=(x\oplus y\oplus z)\ \text{and}\ B=2(z\wedge(x\oplus y)\oplus(x\wedge y)).$$

As can be seen, expressions of A and B involve logical operations only.

Figure 2:
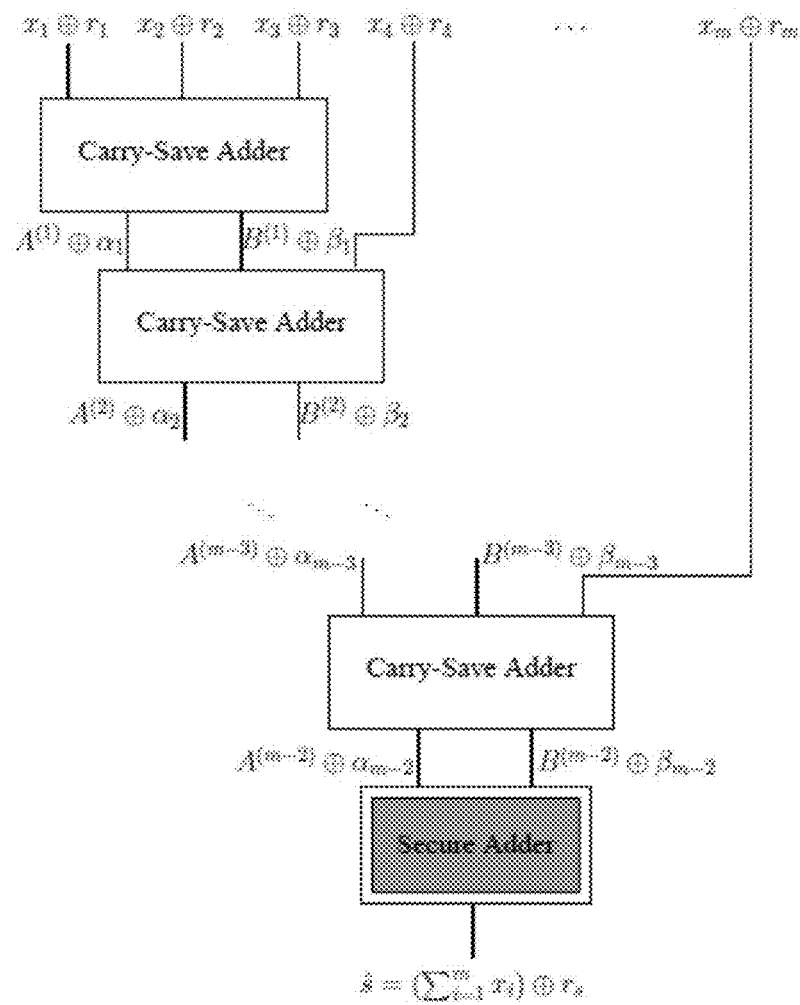
FIG. 2 illustrates a generalization to three or more integers.

The approach extends naturally to more than three integers by iteration, as illustrated in FIG. 2.

For example, four kbit integers $x_1$, $x_2$, $x_3$, $x_4$ are added using two iterations as $A^{(1)}=(x_1\oplus x_2\oplus x_3)$, $B^{(1)}=2(x_3\wedge(x_1\oplus x_2)\oplus(x_1\wedge x_2))$, $A^{(2)}=(A^{(1)}\oplus B^{(1)}\oplus x_4)$, $B^{(2)}=2(x_4\wedge(A^{(1)}\oplus B^{(1)})\oplus(A^{(1)}\wedge B^{(1)}))$ and finally $x_1+x_2+x_3+x_4=A^{(2)}+B^{(2)}$.

More generally, m k-bit integers, $x_1, x_2, \ldots, x_m \in \mathbb{Z}_{2^k}$, are added with (m−2) evaluations of pairs ($A^{(i)}$, $B^{(i)}$), 1≤i≤m−2, and a final addition to eventually get their sum, $s=\Sigma_{i=1}^m x_i$, as $s=A^{(m-2)}+B^{(m-2)}$.

The secure version of the carry-save addition using blinded input $\widehat{x_1}$, $\widehat{x_2}$, . . . , $\widehat{x_m}$ and from masks $r_1$, $r_2$, . . . , $r_m$ works as follows:

1. A is securely evaluated as:

$$\hat{A}=\hat{A}\oplus\hat{B}\oplus\hat{C}, R_A=R_A\oplus R_B\oplus R_C.$$

where $\hat{A}=\widehat{x_1}$, $R_A=r_1$ and $\hat{B}=\widehat{x_2}$, $R_B=r_2$ and $\hat{C}=\widehat{x_m}$, $R_C=r_3$ 2. B is computed from $\hat{A}$, $\hat{B}$, $\hat{C}$ and from masks $R_A$, $R_B$, $R_C$. as follows:
  i) Compute $\hat{T}_1=\lambda\oplus x_1\wedge x_2$ as a secure AND using $\hat{A}$, $\hat{B}$, $R_A$, $R_B$ and a random λ with Trichina's method.
  ii) Compute $\hat{T}_2=\hat{A}\oplus\hat{B}$ and $R_{T_2}=R_A\oplus R_B$.
  iii) Compute $\hat{B}=[x_3\wedge(x_1\oplus x_2)\oplus(x_1\wedge x_2)]\oplus\lambda$ using $\hat{T}_1$, $\hat{T}_2$, $\hat{C}$, λ, $R_{T_2}$, $R_C$ with a variant of Trichina's method.
  iv) Finally set $\hat{B}=2\hat{B}$ and $R_B=2\lambda$.

This process is repeated again with $\hat{C}=\widehat{x_4}$, $R_C=r_4$ and the new values of A, B, $R_A$ and $R_B$. The process is repeated (m−2) times until $\hat{C}=\widehat{x_m}$, $R_C=r_m$, which enables us getting the pair ($A^{(m-2)}$, $B^{(m-2)}$). Every iteration requires 22 additional operations. Therefore, the total cost of the generalized algorithm is 22(m−2)+5 k+8=22 m+5 k−36.

The addition algorithm for m blinded operands can be described as follows:

| Algorithm 5 Secure binary addition with m blinded operands |
| --- |
| Input: ($\hat{x}_1$, ..., $\hat{x}_m$, $r_1$, ..., $r_m$) ∈ $(\mathbb{Z}_{2^k})^{2m}$ such that $\hat{x}_1 = x_1 \oplus r_1$, ..., $\hat{x}_m = x_m \oplus r_m$ |
| Output: ($\hat{s}$, $r_s$) where $\hat{s} = (\Sigma_{i=1}^m x_i) \oplus r_s$ (mod $2^k$) |
| 1: λ ← random($2^k$); |
| 2: A ← $\hat{x}_1$; $R_A$ ← $r_1$; B ← $\hat{x}_2$; $R_B$ ← $r_2$ |
| 3: for i = 1 to m − 2 do |
| /* Compute Δ = λ ⊕ (A ∧ B) */ |
| 4. T ← A ∧ B; D ← T ⊕ λ |
| 5.     T ← A ∧ $R_B$; D ← D ⊕ T |
| 6.     T ← $R_A$ ∧ B; D ← D ⊕ T |
| 7.     T ← $R_A$ ∧ $R_B$; D ← D ⊕ T |
| /* Compute 2 [Δ ⊕ $\hat{x}_{i+2}$ ∧ (A ⊕ B)] */ |
| 8.     A ← A⊕B; $R_A$ ← $R_A$⊕$R_B$ |
| 9.     T ← $\hat{x}_{i+2}$ ∧ A; B ← T ⊕ D |
| 10.     T ← $\hat{x}_{i+2}$ ∧ $R_A$; B ← B ⊕ T |
| 11.     T ← $r_{i+2}$ ∧ A; B ← B ⊕ T |
| 12.     T ← $r_{i+2}$ ∧ $R_A$; B ← B ⊕ T |
| 13.     B ← 2B; $R_B$ ← 2λ |
| /* A ⊕ $x_{i+2}$ */ |
| 14.     A ← A ⊕ $\hat{x}_{i+2}$; $R_A$ ← $R_A$ ⊕ $r_{i+2}$ |
| 15. end for |
| 16. SecureAdd(A, B, $R_A$, $R_B$) using Algorithm 3 |

Although described for adding over numbers modulo $2^k$, the secure addition algorithm (Algorithm 3) readily extends to output the results over the integers. The algorithm can indeed accommodate operands of arbitrary length and compute their blinded sum by running it modulo $2^{k+1}$ for any k≥max(bit-length(x), bit-length(y))—where "bit-length" denotes the binary length.

The secure addition algorithm (Algorithm 3) can also be used for subtraction. $\bar{x}$ is used to denote the bitwise complementation of x, namely $\bar{x}=x\oplus(-1)$. The secure subtraction algorithm runs in three steps:
1. Compute $\bar{x}$;
2. Use Algorithm 3 on input ($\bar{x}$, $\hat{y}$, $r_x$, $r_y$) and obtain ($\hat{s}$, $r_s$) where $\hat{s}=(\bar{x}+y)\oplus r_s$ and $r_s=r_x+r_y$;
3. Set $\hat{w}=\bar{\hat{s}}$ and $r_w=r_s$, and return ($\hat{w}$, $r_w$)
where $\hat{w}=(x-y)\oplus r_w$ (mod $2^k$) and $r_w=r_x\oplus r_y$.

This subtraction algorithm can also be adapted to work with more than two operands and over the integers, as described for the addition algorithm.

FIG. 1 illustrates a cryptographic device according to a preferred embodiment of the present principles. The cryptographic device 110 comprises an input unit 111 for receiving input and an output unit 113 for outputting data. The cryptographic device further comprises a hardware processor 112 configured to receive two or more input operands (one in the single-variable variant) and to perform secure modular addition according to any of the embodiments described herein.

It will thus be appreciated that a software implementation of the present principles provides modular addition algorithms that is resistant against DPA attacks. The algorithms work with modular subtraction as well and are more efficient than Goubin's method. Using the same number of registers 13 elementary operations can be saved when two masked operands are used and 10 elementary operations are saved when only one masked operand is used.

For 8-bit processors the gain of the algorithm is significant as it represents a decrease of about 21.3%. It will thus be appreciated that the algorithm provides the optimal choice regarding memory versus speed complexity, which makes the algorithm attractive for resource-constraint devices.

The algorithm can be used for protecting the International Data Encryption Algorithm (IDEA) and TEA family block ciphers (TEA, XTEA, XXTEA) as well as Hash Message Authentication Code (HMAC) algorithms based on SHA-1 or SHA-2 against DPA attacks. IDEA uses 16-bit operands whereas SHA-1 or SHA-2 uses 32-bit operands. For smaller operands, one could also use our algorithm for protecting Secure And Fast Encryption Routine (SAFER). SAFER encryption uses additions modulo 28. For larger operands, the algorithm is also applicable to the SKEIN hash function or the Threefish block-cipher that work with variables of 64-bit size.

It will be appreciated that the method of the present principles is particularly suited for devices with limited resources, in particular memory that otherwise for example could be used to store lookup tables.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method of performing modular addition between a first integer value x and a second integer value y, the method comprising, in a hardware processor:

obtaining a first masked input $\hat{x}$, a second masked input $\hat{y}$, a first mask $r_x$ and a second mask $r_y$, the first masked input $\hat{x}$ resulting from the first integer value x masked by the first mask $r_x$ and the second masked input $\hat{y}$ resulting from the second integer value y masked by the second mask $r_y$;

computing a first iteration carry value $c_1$, using the first masked input $\hat{x}$, the second masked input $\hat{y}$, the first mask $r_x$, and the second mask $r_y$;

recursively updating intermediate carry values $c_i$, to obtain a final carry value $c_{k-1}$, wherein an intermediate carry value is updated using the first masked input $\hat{x}$, the second masked input $\hat{y}$, the first mask $r_x$ and the second mask $r_y$;

combining the first masked input $\hat{x}$ and the second masked input $\hat{y}$ and the final carry value $c_{k-1}$ to obtain a masked result; and outputting the masked result.

2. The method of claim 1, wherein the first iteration carry value, the intermediate carry values and the final carry value are masked and:

the first iteration carry value $c_1$ is computed using also a carry mask value $\lambda$; and the intermediate carry values $c_i$ are updated using also the carry mask value $\lambda$; and wherein the masked result is obtained by:

combining the first masked input $\hat{x}$ and the second masked input $\hat{y}$ and the final masked carry value to obtain an intermediate value; and combining the intermediate value with the carry mask value to obtain a masked result.

3. The method of claim 2, wherein the intermediate value and the masked result are obtained using XOR between the combined values.

4. The method of claim 2, further comprising outputting a combination of the first mask $r_x$ and the second mask $r_y$.

5. The method of claim 4, wherein the combination of the first mask $r_x$ and the second mask $r_y$ is obtained using XOR.

6. The method of claim 1, wherein the modular addition is used to subtract the second integer value y from the first integer value x, the method further comprising:

between the obtaining and the computing, setting the first masked input $\hat{x}$ to the bitwise complementation of the first masked input $\hat{x}$; and between the combining and the outputting, setting the masked result to the bitwise complementation of the masked result.

7. A device for performing modular addition between a first integer value x and a second integer value y, the device comprising a hardware processor configured to:

obtain a first masked input $\hat{x}$, a second masked input $\hat{y}$, a first mask $r_x$ and a second mask $r_y$, the first masked input $\hat{x}$ resulting from the first integer value x masked by the first mask $r_x$ and the second masked input y resulting from the second integer value y masked by the second mask $r_y$;

compute a first iteration carry value $c_{1f}$, using the first masked input $\hat{x}$, the second masked input $\hat{y}$, the first mask $r_x$, and the second mask $r_y$;

recursively update intermediate carry values $c_i$, to obtain a final carry value $c_{k-1}$ wherein an intermediate carry value is updated using the first masked input $\hat{x}$, the second masked input $\hat{y}$, the first mask $r_x$ and the second mask $r_y$;

combine the first masked input $\hat{x}$ and the second masked input $\hat{y}$ and the final carry value $c_{k-1}$ to obtain a masked result; and output the masked result.

8. The device of claim 7, wherein the first iteration carry value, the intermediate carry values and the final carry value are masked and the hardware processor is configured to:

compute the first iteration carry value $c_1$ using also a carry mask value $\lambda$; and update the intermediate carry values $c_i$ using also the carry mask value $\lambda$; and wherein the hardware processor is configured to combine the first masked input $\hat{x}$ and the second masked input $\hat{y}$ and the final masked carry value to obtain an intermediate value, and to combine the intermediate value with the carry mask value to obtain the masked result.

9. The device of claim 8, wherein the intermediate value and the hardware processor is configured to use XOR between the combined values to obtain the masked result.

10. The device of claim 8, wherein the hardware processor is further configured to output a combination of the first mask $r_x$ and the second mask $r_y$.

11. The device of claim 7, wherein the hardware processor is configured to use the modular addition to subtract the second integer value y from the first integer value x, the hardware processor being further configured to:

set the first masked input $\hat{x}$ to the bitwise complementation of the first masked input $\hat{x}$; and set the masked result to the bitwise complementation of the masked result.

* * * * *